April 22, 1952 G. BRIGGS 2,593,973

REMOTE-CONTROL DEVICE

Filed June 14, 1948 3 Sheets-Sheet 1

George Briggs
INVENTOR
By Richardson, David and Nordon
his ATTYS

George Briggs
INVENTOR
By Richardson, David and Nordon
his ATTYS.

April 22, 1952

G. BRIGGS 2,593,973

REMOTE-CONTROL DEVICE

Filed June 14, 1948

3 Sheets-Sheet 3

George Briggs
INVENTOR
By Richardson, David and Nordon
his Attys

Patented Apr. 22, 1952

2,593,973

UNITED STATES PATENT OFFICE 2,593,973

REMOTE CONTROL DEVICE

George Briggs, London, England, assignor to B. V. C. Electronics Developments Limited, London, England, a British company Application June 14, 1948, Serial No. 32,762
In Great Britain June 20, 1947

1 Claim. (Cl. 177—380)

This invention relates to remote position indicators i. e. apparatus in which movement of a member at one point results in an exactly corresponding movement of a second member usually at a remote point. There are many applications for such apparatus, certain of which will be referred to hereinafter, but it is useful to mention at this point one specific application to which the present invention is particularly suited. This particular application is to repeater compasses where the reading of a master compass is reproduced at one or more remote points on repeaters. Repeater compasses are already known in which the master compass comprises a north-seeking element freely mounted for rotation within an iron core stator having a three-phase winding, this three-phase winding being connected to a three-phase winding on an iron cored ring stator of the repeater. The pointer or indicator of the repeater then follows the movement of the north-seeking element of the master compass in accordance with the Selsyn principle. Now this known form of repeater compass suffers from certain disadvantages which tend to prevent the repeater reading being exactly the same as the master reading. These disadvantages arise from (1) the hysteresis of the iron core stators, (2) the back reaction of the repeater or repeaters on the master and (3) the high moment of the magnetic element. The effect of the hysteresis in falsifying the readings will be obvious, and with regard to the second disadvantage it will be appreciated that with this known system the repeaters are, in effect, replicas of the master and just as the master tends to drive the repeaters so will the repeaters tend to drive the master. The use of mu-metal for the iron cores of the stators does reduce the hysteresis error but does not eliminate it.

One of the objects of the present invention is to overcome the above mentioned disadvantages.

A further object of the present invention is to provide a repeater compass in which the master compass may be of very small size and weight with the obvious corresponding advantages.

Still a further object of the present invention is generally to improve the construction and arrangement of the various parts of remote position indicators and more particularly repeater compasses.

A master element for a remote position indicator according to the present invention comprises a fluid or liquid filled bowl, three curved stator electrodes symmetrically arranged and each subtending an angle of less than 120° at the centre of the bowl, a rotor rotatably arranged within the stator electrodes and having diametrically opposite electrodes co-operating with the stator, and means for applying equal and opposite potentials to the rotor electrodes so that the magnitude and relative phases of the potentials established at the stator electrodes is directly related to the position of the rotor relative to the stator electrodes.

In the case of a master compass for a repeater compass the rotor carries one or more permanent magnets, conveniently the rotor is supported on a single pivot at the centre of curvature of the stator electrodes and carries a pair of permanent magnets symmetrically spaced on either side of the centre of rotation of the rotor and located below the plane of the rotor electrodes, or a ring magnet.

In one embodiment of the present invention the fluid or liquid filled bowl is spherical, or substantially spherical, the rotor is supported on a pivot at the centre of the sphere, the stator electrodes being spherically curved about the centre of the sphere to compensate for possible tilt errors.

The remote indicator or repeater compass according to the present invention is preferably constructed similarly to a sensitive moving coil milliammeter and comprising a moving coil to which the indicator is coupled suspended for free movement either about or within a stator provided with three symmetrically disposed stator windings, the currents flowing in which are determined by the position of the rotor of the master element relative to the stator electrodes of the master, alternating currents of the same frequency as those supplied to the rotor of the master element being fed to the moving coil.

The outputs from the three-stator electrodes of the master element or master compass may be amplified by a three-phase amplifier and fed to the corresponding stator coils of the repeater.

Several other novel and advantageous features both of construction and arrangement are provided by the present invention, these being more fully described hereinafter.

In order that this invention may be the more clearly understood and readily carried into effect, reference may be made to the accompanying drawings which illustrate by way of example certain convenient embodiments of the present invention and in which.

Figure 1:
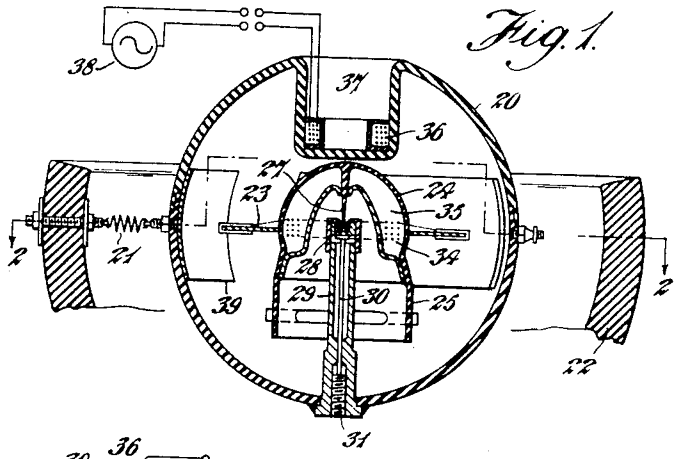
Figure 1 is a central vertical section through the preferred form of master compass according to the present invention.
Figures 2, 3:
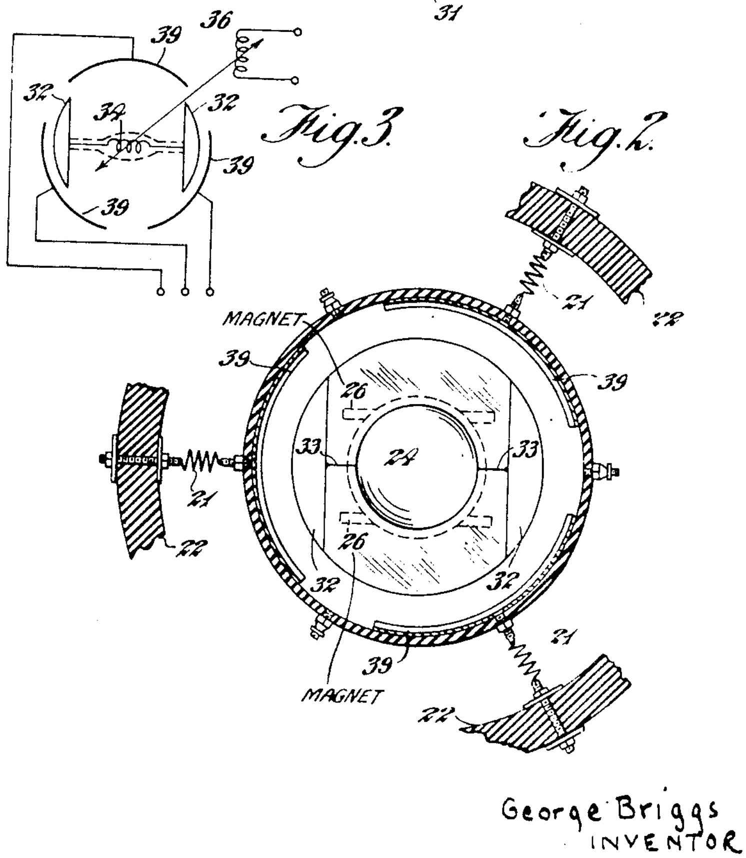
Figure 2 is a section on line 2—2 thereof.
Figure 3 illustrates one method of supplying the equal and opposite potentials to the rotor electrodes.

Referring now more particularly to Figures 1 to 3 of the accompanying drawings, the master compass therein illustrated comprises a spherical, or substantially spherical, fluid or liquid filled bowl 20 of a suitable insulating material resiliently supported by means of three radial springs 21 in an outer hemispherical cup or support 22. It will be appreciated that the springs 21 form only one means of mounting the bowl 20 is a vibration free manner within the support 22 and that other means of attaining this end may be employed without departing from the scope of the present invention. Thus, for example, the support 22 may be spherical and the bowl 20 be mounted therein on sponge rubber, either instead of on the springs, or in addition to the springs 21. It may be pointed out, however, that the springs 21 form a convenient means of making connections to certain parts of the master compass as will be described hereinafter.

The compass card 23 is provided with a domed centre 24 and a downwardly depending skirt 25, the skirt 25 carrying near its lower ends two permanent magnets 26 symmetrically spaced one on each side of the axis of rotation of the compass card 23.

The compass card 23 is mounted for free rotation by means of a pivot pin 27 extending downwardly within the dome 24, the end of the pin 27 resting on a jewel bearing 28 arranged at the upper end of a sleeve 29 extending upwardly from the bottom of the bowl 20. The position of the jewel 28 is adjustable in order to ensure that the point on which the compass card is pivoted lies exactly at the centre of the bowl 20 by means of a rod 30, which carries the jewel cup at its upper end and an adjusting screw 31 screwing into the lower end of the sleeve 29.

It should be noted here that whilst the master compass may, of course, be made of any size or shape without departing from the scope of the present invention, it is preferable to make the same, and particularly the compass card and its associated moving parts, small, so as to reduce the possibility of the swirl and other errors and to reduce the erratic behaviour of magnets of high moment in fast flying aircraft.

The rotor of the compass is conveniently carried by the compass card 23 and comprises platinum or like electrodes 32 arranged over diametrically opposite chords of the compass card. These two electrodes 32 are connected up by insulated wires or leads 33 lying on the face of the compass card to the ends of a coil 34 housed within an annular compartment 35 in the dome 24 of the compass card. Whilst it has been found convenient to shape the electrodes 32 as shown in Figure 2 of the accompanying drawings and to extend the same over both the top and bottom of the compass card as shown in Figure 1, various other arrangements of electrodes may be employed. Thus, for example, the electrodes may comprise thin wires arranged around, or near, the periphery of the compass card, but in all cases it is preferable to have rotor electrodes which present a comparatively thin peripheral surface to the bowl 20. The arc over which the rotor electrodes extend may vary very widely without departing from the scope of the present invention. It is obviously necessary that they subtend an angle of less than 180° at the centre of the compass card and, in practice, rotor electrodes extending over an arc of 90° have been found to give excellent results. Furthermore, the spacing between the edge of the compass card and the inside of the bowl 20 should not be too small and the relative proportions of the parts shown in Figures 1 and 2 of the drawings has been found to be satisfactory.

A small air-cored fixed coil 36 is located in a depression 37 in the upper part of the bowl 20 concentrically with the coil 34 and this coil 36 is supplied with alternating current say of the order of 400 cycles, from an appropriate source 38. The coil 36 serves to induce alternating currents into the coil 34 as illustrated in Figure 3, whereby equal and opposite alternating current potentials are applied to the rotor electrodes 32. With a view to increasing the amount of current induced into the rotor coil 34 the same may, if desired, be provided with a small annular core of mu-metal or a similar high permeability alloy, and, likewise, a core of mu-metal or other high permeability alloy may be provided in the coil 36.

Arranged around, and, carried by, the inner periphery of the bowl 20 are three stator electrodes 39 which are out of metallic contact with one another, made of non-ferrous metal, and subtend an angle of less than 120° at the centre of rotation of the compass card 23. The arc over which the stator electrodes 39 extend may vary without departing from the scope of the present invention. In all cases, however, the disposition of the stator electrodes must be symmetrical, and, as in the case of the rotor electrodes 32, good results have, in practice, been obtained with electrodes extending over a arc of 90°.

It is convenient where conditions of excess tilt are likely to be encountered and where extreme accuracy is desired to make the stator electrodes 39 of strip form and to curve the same spherically to agree with the contour of the bowl 20. This will avoid all chance of tilt errors being introduced, particularly if the height of the stator electrodes be of the same order as that shown in the drawings, but it will be appreciated that where excess tilt is not likely to be encountered, and where an extremely high degree of sensitivity is not required, it may be more convenient, from a practical point of view, to make the bowl 20 mainly cylindrical, in which case the stator electrodes 39 may be curved cylindrically rather than spherically.

The supporting springs 21 may be used to lead out the circuits from the stator electrodes 39 as shown more particularly in Figure 2.

The fluid or liquid with which the compass bowl 20 is filled is a weak conductor and it will be seen that the currents flowing in the circuits connected to the stator electrodes 39 will depend entirely upon the position of the rotor electrodes 32 relative to the stator electrodes 39 and this, of course, depends upon the position of the compass card 23 and magnets 26.

If the rotor 23, 24 and 25 be rotated through 360° the amplitude of the current flowing in the circuit of each stator electrode 39 will undergo a regular variation in value, but, at any one angular position of the rotor, the vectorial sum of the currents flowing in the stator electrode circuits will be substantially constant when the external circuit is symmetrical.

I shall thus have what may, and will hereinafter, be termed a three-phase output from the master compass, but it will be understood that the expression "three-phase" used herein differs from the usual conception of this term.

What is required to complete the repeater compass is one or more repeater instruments which are caused to follow the movements of the master accurately. Where the master compass is of small dimensions, and it may be mentioned that a bowl 20 having an outside diameter of the order of 1½ to 2 inches has been found to be very effective, the output from the stator electrodes will of course be small and in such circumstances it is desirable to amplify the same before feeding it to the repeater compasses. For this purpose, obviously, a three-phase balanced amplifier is required and one very convenient and efficient form of three-phase amplifier suitable for this purpose forms the subject matter of my co-pending patent application No. 14752/48 divided herefrom. It will be understood, however, that any other form of balanced three-phase amplifier comprising the three amplifier chains A, B and C shown in Figure 12 may be used for coupling the master compass to the repeater compass or compasses.

Turning now to the repeater compass, the preferred embodiment of this feature of the present invention is shown in Figures 4 to 11 of the accompanying drawings.

Figures 4, 7, 9:
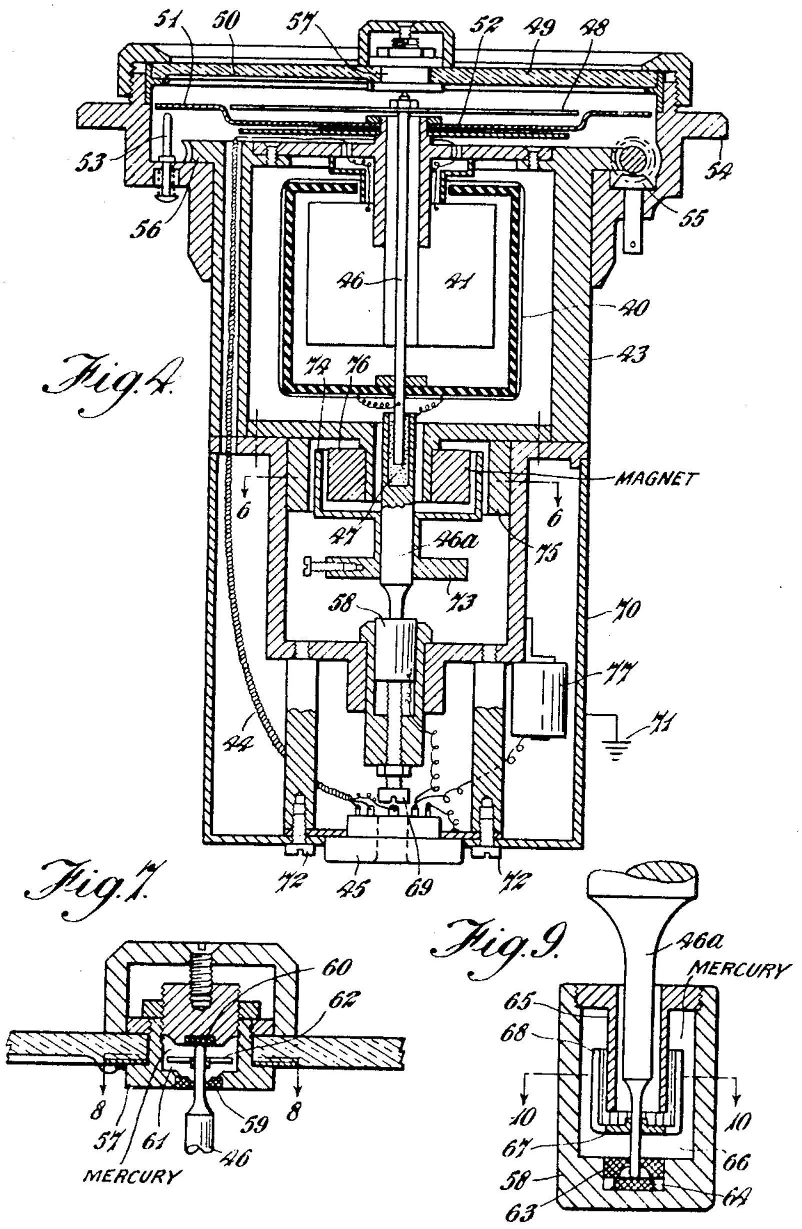
Figure 4 is a central vertical section through a convenient form of repeater instrument according to the present invention.
Figure 7 is a central vertical section through a mercury cup and bearing for the upper end of the moving coil spindle.
Figure 9 is a central vertical section through a mercury cup and bearing for the lower end of the moving coil spindle.
Figures 5, 6, 8, 10, 11, 12:
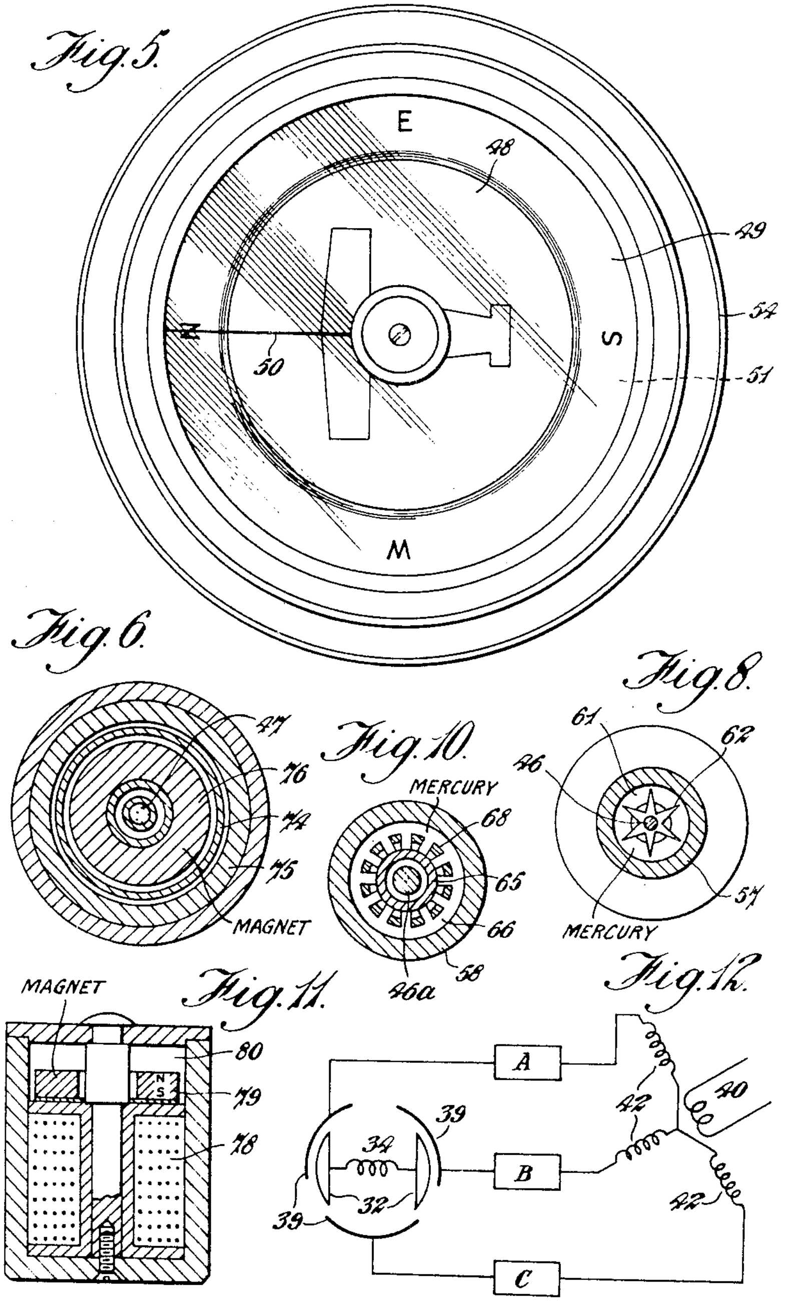
Figure 5 is a plan view thereof.
Figure 6 is a section on line 6—6 of Figure 4.
Figure 8 is a local section on line 8—8 of Figure 7.
Figure 10 is a section on line 10—10 of Figure 9.
Figure 11 is a central vertical section through a vibrator adapted to prevent sticking of the movement of the repeater instrument.
Figure 12 illustrates somewhat diagrammatically the circuit diagram of a master compass and associated repeater intrument according to the present invention.

Referring now more particularly to Figures 4 and 5 of the accompanying drawings, the repeater compass therein illustrated is constructed similarly to a sensitive moving coil milliammeter and comprises a moving coil 40 mounted for free rotation about a central stator 41 which is wound with a three-phase star-connected winding 42 (Figure 12). The moving coil may, if desired, be arranged within the three-phase wound stator but, in practice, it has been found better to mount the moving coil for movement about the stator rather than within it, and to mount the whole movement within a cylindrical housing 43 of soft iron which serves to concentrate the field. The three phase winding of the stator is fed with the amplified three-phase output from the master instrument through leads 44 terminating in a multiple socket 45.

The spindle 46 on which the moving coil is mounted is divided into upper and lower parts 46 and 46*a* respectively, the parts 46 and 46*a* being insulated from one another by an insulating sleeve 47 and serving for the purpose of supplying alternating current of say 400 cycles to the coil 40. The currents supplied to the moving coil 40 of the repeater instrument are of the same frequencies as those supplied to the rotor of the master instrument.

The spindle 46 carries the indicator card or the like 48 of the repeater, this card being viewed through a glass cover 49 which is provided with the usual lubber line 50. The lubber line 50 may be in the form of a wire, or sprayed line of conducting material, on the inside of the glass 49 and serves as one lead to the spindle 46 in a manner which will be described more fully hereinafter.

Around the indicator card 48 is arranged a graduated compass card 51. The compass card is mounted on the main housing 43 of the instrument in such a manner that an initial adjustment of the compass card 51 relative to the housing 43 is possible. For this purpose, the compass card is not rigidly connected to the housing but is connected thereto through the intermediary of a friction washer 52. In order to effect the initial adjustment of the compass card the same is engaged by a spring plunger 53 and the housing 43 is turned relative to the main mounting portion 54 by means of a bevel and worm gear 55 engaging with the toothed outer periphery of a shoulder 56 on the housing 43. No claim is made herein to this method of initially adjusting the compass card 51.

The upper end of the spindle 46 is mounted in a mercury cup and bearing 57 and the lower end of the spindle 46*a* is mounted in a non-spill mercury cup and bearing 58. These mercury cups and bearings ensure the maintenance of a good connection with the spindle and hence to the moving coil at all positions.

Turning now to the mercury cup and bearing for the upper end of the spindle 46 and referring more particularly to Figures 7 and 8, it will be seen that the reduced end of the spindle 46 passes through a journal jewel bearing 59 and then engages with an adjustable thrust jewel bearing 60 which leaves a chamber 61 within the bearing 57. This chamber 61 is internally serrated or roughened, is partly filled with mercury and near its upper end the spindle 46 is provided with a serrated disc 62 which lies within the mercury in the chamber 61. This serrated disc cuts into the mercury and ensures the maintenance of a good contact at all times, and in all positions.

The bearing 58 for the lower end of the spindle 46*a* is of different construction and comprises a non-spill mercury cup and bearing. The reduced lower end of the spindle 46*a* runs in a journal jewel bearing 63 and on a thrust jewel bearing 64 which are located at the end of the housing of the bearing. The bearing is provided with a re-entrant tube 65 around the end of the spindle 46*a* in order to render the bearing non-spill and the chamber 66 within the bearing is partially filled with mercury. The reduced end of the spindle 46*a* is provided with a metallic cup 67 the upper portion of which extends around the re-entrant tube and is segmented as at 68. This segmented cup on the spindle functions in the same way as the serrated disc 62 described above in order to cut into the mercury and ensure a good contact with the spindle at all angles of tilt. The non-spill mercury bearing 58 is adjustable by means of the adjusting screw 69 to maintain a good adjustment in the bearings.

Below the housing 43 the repeater is provided with a metallic cover 70 which is earthed as at 71 (earthing of course the housing 43), the cover 70 being held in position by means of screws 72.

A balancing disc 73 is provided on the spindle

46*a* to balance the rotor assembly in the usual way.

The lower part 46*a* of the spindle of the moving coil carries an aluminium cup 74 the skirt of which rotates within a fixed iron ring 75 whilst a fixed magnet 76, conveniently in the form of a disc polarised across its faces is disposed within the cup 74. This assembly constitutes a magnetic or eddy-current brake which effectively damps the oscillations of the rotor.

With a view to preventing sticking of the movement a small vibrator 77 is mounted at a convenient point within the instrument. This vibrator (see Figure 11) comprises a coil winding 78, to which A. C. is supplied, about the centre iron core of a closed magnetic path formed in the iron casing and an axially polarised magnetic ring 79. The magnetic ring 79 is free to vibrate axially within an upper compartment 80 of the vibrator housing being alternately attracted and repelled during each A. C. cycle. The vibrator serves to apply a small vibration to the repeater compass which effectively prevents sticking of the movement.

The repeater instrument is connected up in the manner shown in Figure 12. The different currents in the three-phases of the output from the master due to the position of the rotor of the master compass relative to the electrodes of the stator thereof will be reproduced in the stator coils 42 of the repeater compass and will ensure that the moving coil 40 of the repeater compass will be pulled round to, and held at, such a position as to give a reading identical with that of the master compass.

Although the present invention has been more particularly described as embodied in a repeater compass it will be obvious that it is equally applicable to a remote position indicator. Thus, for example, if we omit the magnets 26 from the master instrument and move the rotor 23, 24 and 25 thereof by hand, the indicator disc 48 of the repeater instrument will accurately follow the movements of the rotor of the master instrument.

Again, whilst in the embodiment of the present invention illustrated in the accompanying drawings the equal and opposite potentials on the rotor electrodes of the master compass have been obtained by inducing the appropriate currents into a coil carried by the rotor, this is not essential. For example, if the rotor of the master compass or the master element of a remote position indicator be mounted between upper and lower pivots it is possible to insulate the pivots from one another, to connect one rotor electrode to one pivot and the other electrode to the other pivot and to supply the required A. C. potentials to the rotor electrodes. Alternatively, the compass card may be mounted on a single pivot and the currents be injected into the electrodes from upper and lower fixed electrodes (the lower of which may form the pivot) to small cups on the card, through a short liquid path, the upper and lower cups being insulated from one another, and being connected one to one electrode and the other to the other electrode. By this means it is possible to obtain sufficiently large currents direct from the stator electrodes of the master to operate the rotor without the interposition of an amplifier. Such an arrangement is distinctly feasible where the size of the rotor is not material but is not to be preferred where one wishes to use a small rotor and small magnets with their corresponding advantages.

One of the great advantages of the present invention is that the repeater compass or repeater element has no back reaction on the master and so a high degree of sensitivity and accuracy can be obtained.

The instruments according to the present invention have many applications both in the form of repeater compasses and remote position indicators. They are, thus, applicable to the provision of an accurate north datum line for radar purposes.

I claim:

A master element for a remote position indicator comprising a liquid filled bowl, three curved stator electrodes symmetrically arranged and each subtending an angle of approximately 90° at the centre of the bowl, a rotor rotatably arranged within the stator electrodes coincident with the axis of the stator electrodes and having two diametrically opposite electrodes co-operating with the stator, said rotor electrodes subtending an angle to the center of the rotor which is the same as the angle so subtended by the stator electrodes, and means for applying equal and opposite potentials to the rotor electrodes so that the magnitude and relative phases of the potentials established at the stator electrodes is directly related to the position of the rotor relative to the stator electrodes.

GEORGE BRIGGS.

REFERENCES CITED

The following references are of record in the file of this patent:

UNITED STATES PATENTS

| Number | Name | Date |
|---|---|---|
| Re. 22,409 | Lyman et al. | Dec. 21, 1943 |
| 509,095 | Perry | Nov. 21, 1893 |
| 1,506,625 | Forster | Aug. 26, 1924 |
| 1,589,039 | Anschutz-Kaempfe | June 15, 1926 |
| 1,837,292 | Richter | Dec. 22, 1931 |
| 1,991,129 | Urfer | Feb. 12, 1935 |
| 2,003,929 | Fischel et al. | June 4, 1935 |
| 2,067,467 | Urfer | Jan. 12, 1937 |
| 2,111,442 | West | Mar. 15, 1938 |
| 2,252,053 | Watson | Aug. 12, 1941 |
| 2,315,176 | Zacharia | Mar. 30, 1943 |
| 2,466,763 | Davis | Apr. 12, 1949 |

FOREIGN PATENTS

| Number | Country | Date |
|---|---|---|
| 539,817 | Great Britain | Sept. 25, 1941 |